Sept. 20, 1932.  R. W. SMITH  1,878,647
APPARATUS FOR MAKING MATCH BOOKS
Filed June 6, 1928  13 Sheets-Sheet 1

INVENTOR
RUSSELL W. SMITH
BY
A. D. T. Libby
ATTORNEY

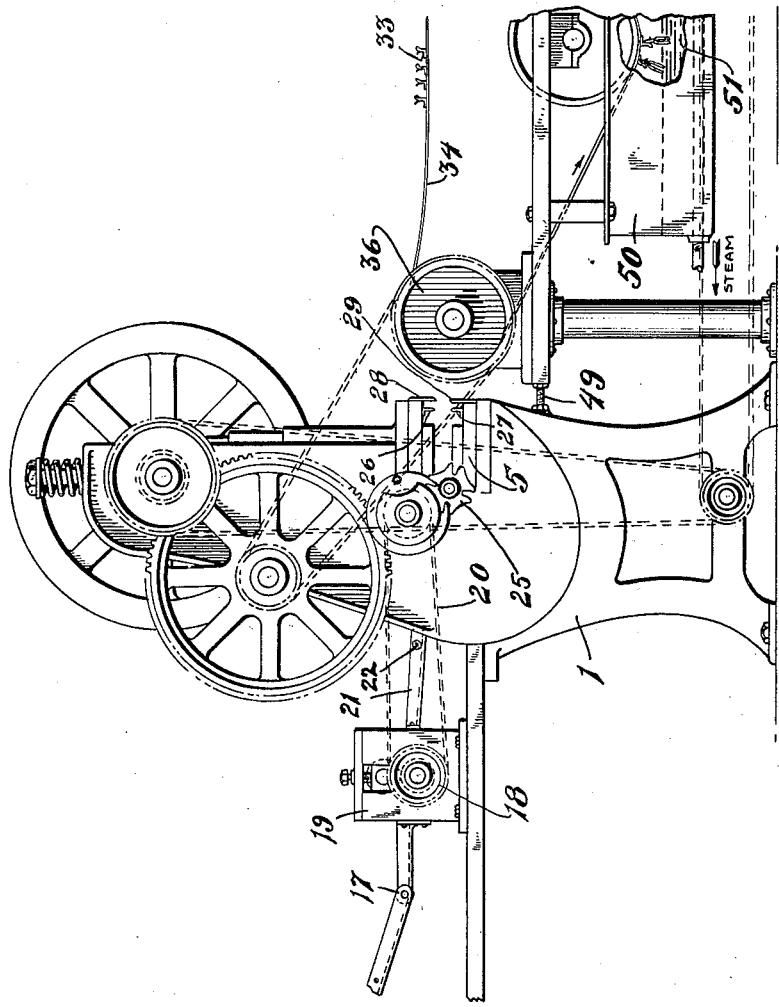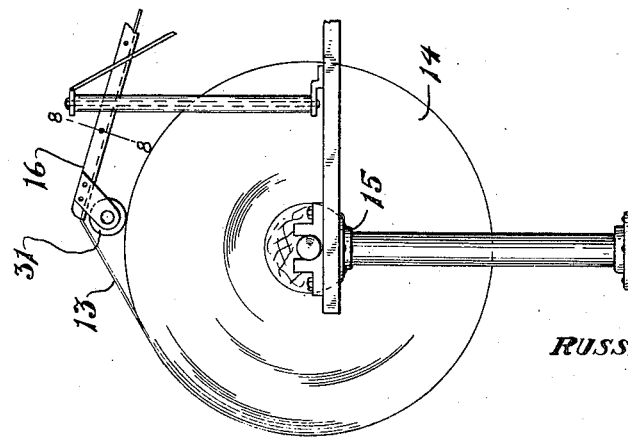

Sept. 20, 1932.    R. W. SMITH    1,878,647
APPARATUS FOR MAKING MATCH BOOKS
Filed June 6, 1928    13 Sheets-Sheet 3
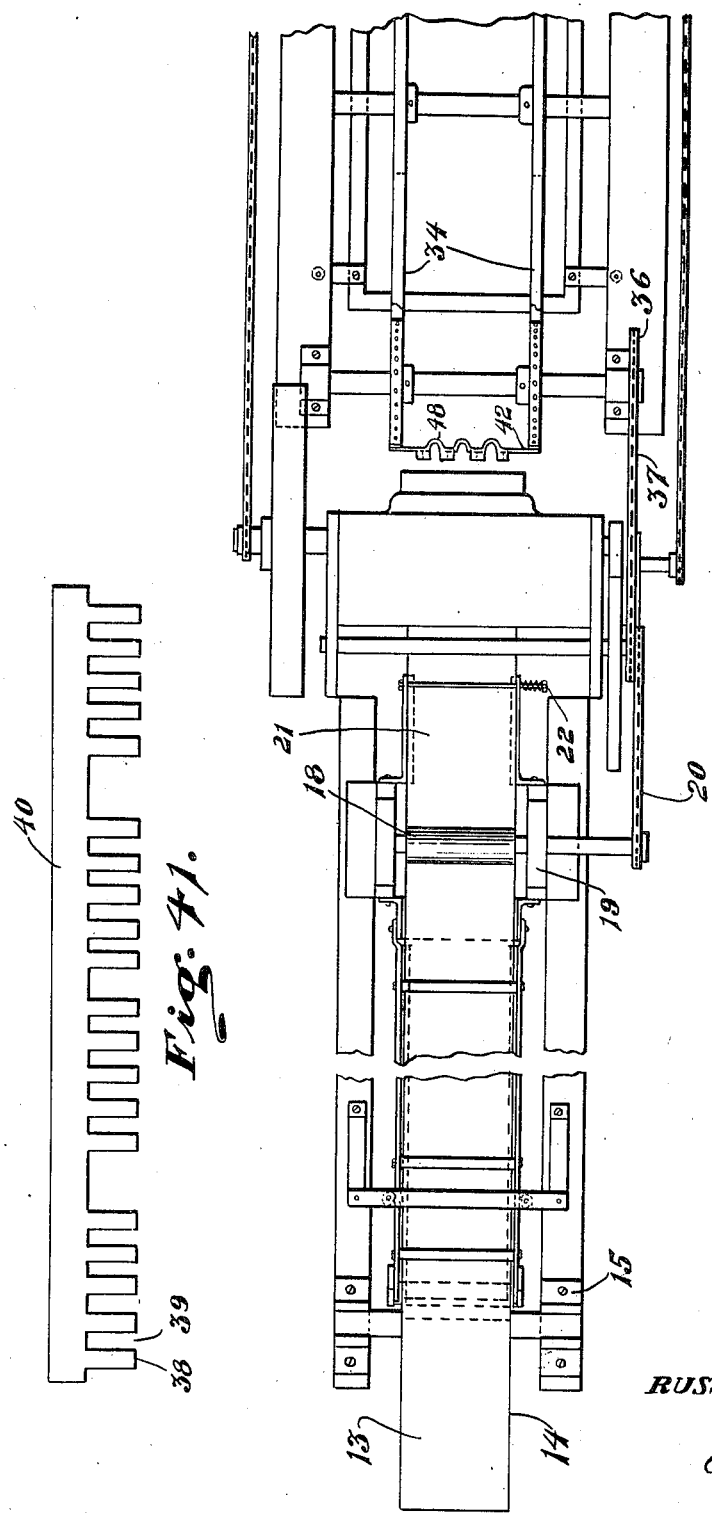
INVENTOR
RUSSELL W. SMITH
BY
A. D. T. Libby
ATTORNEY Sept. 20, 1932.  R. W. SMITH  1,878,647
APPARATUS FOR MAKING MATCH BOOKS
Filed June 6, 1928   13 Sheets-Sheet 4

INVENTOR
RUSSELL W. SMITH
BY
A. D. T. Libby
ATTORNEY

Sept. 20, 1932.  R. W. SMITH  1,878,647
APPARATUS FOR MAKING MATCH BOOKS
Filed June 6, 1928    13 Sheets-Sheet 7

INVENTOR
RUSSELL W. SMITH
BY
A. D. T. Libby
ATTORNEY

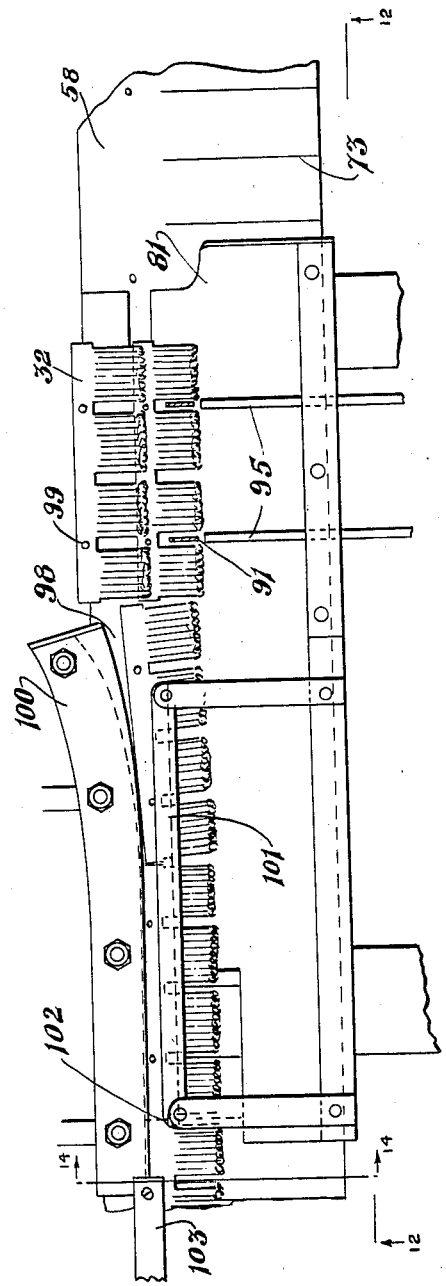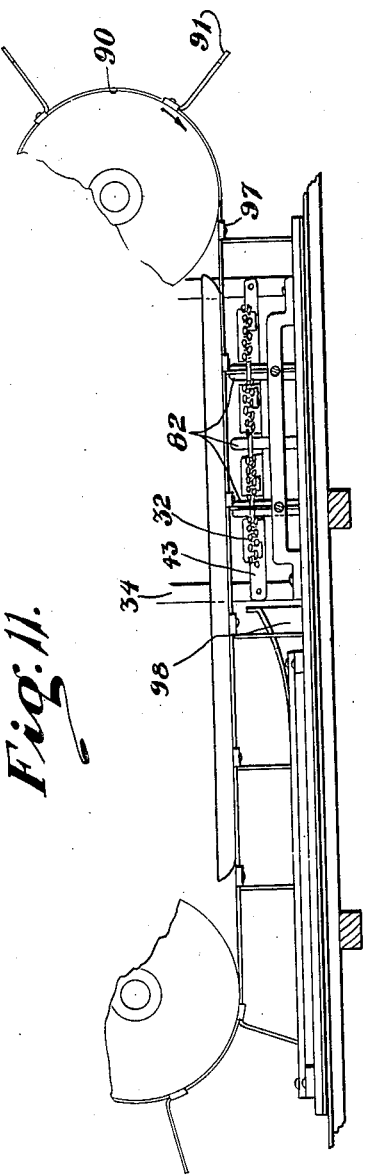

Sept. 20, 1932.   R. W. SMITH   1,878,647
APPARATUS FOR MAKING MATCH BOOKS
Filed June 6, 1928   13 Sheets-Sheet 10

INVENTOR
RUSSELL W. SMITH
BY A. D. T. Libby
ATTORNEY

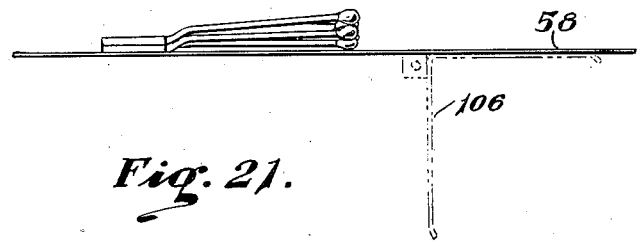
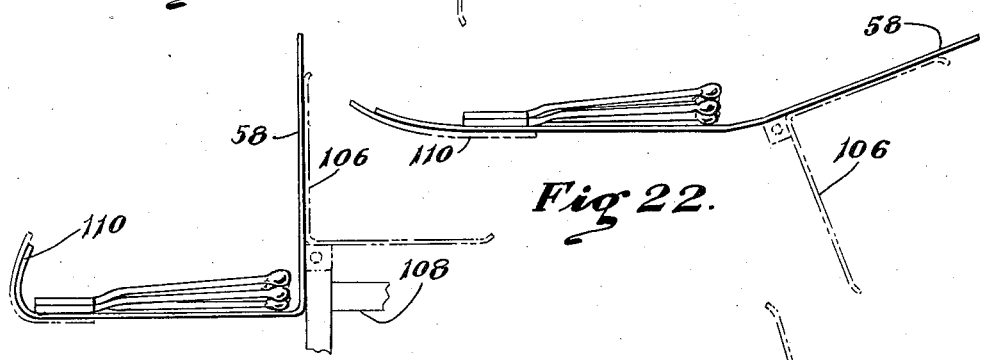
Fig. 21.
Fig. 22.
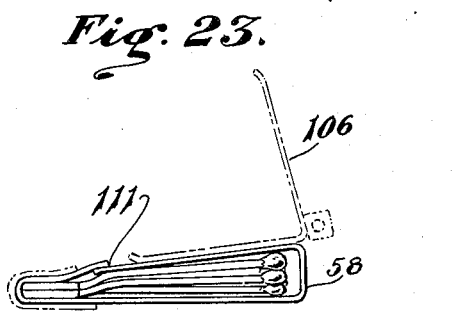
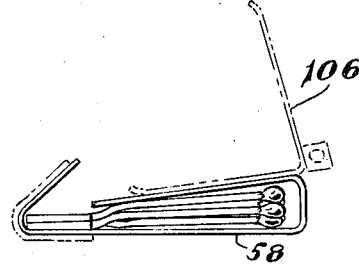
Fig. 23.
Fig. 24.
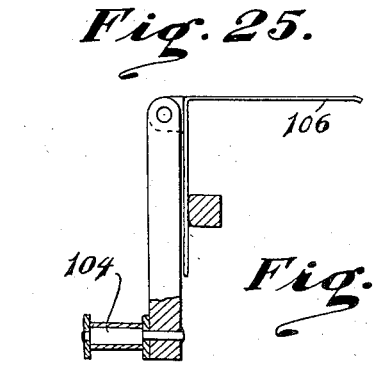
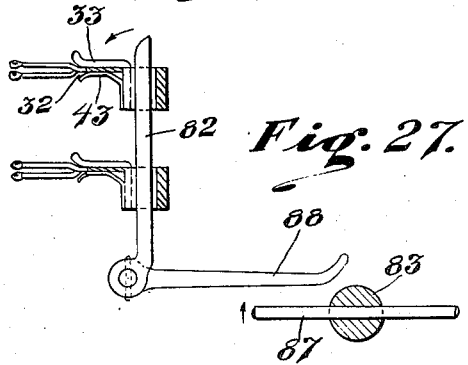
Fig. 25.
Fig. 27.
Fig. 26.
INVENTOR
RUSSELL W. SMITH
BY
A. D. F. Libby
ATTORNEY Sept. 20, 1932. R. W. SMITH 1,878,647
APPARATUS FOR MAKING MATCH BOOKS
Filed June 6, 1928 13 Sheets-Sheet 12

INVENTOR
RUSSELL W. SMITH
BY A. D. T. Libby
ATTORNEY

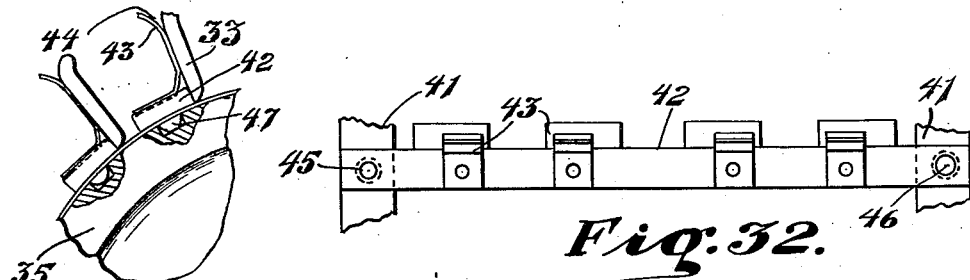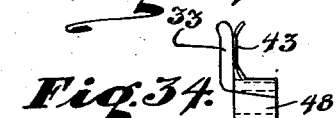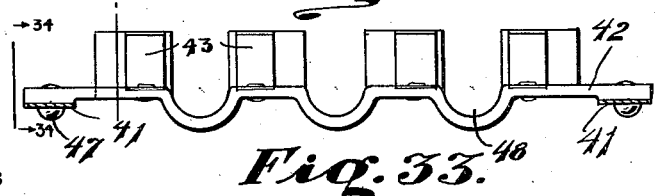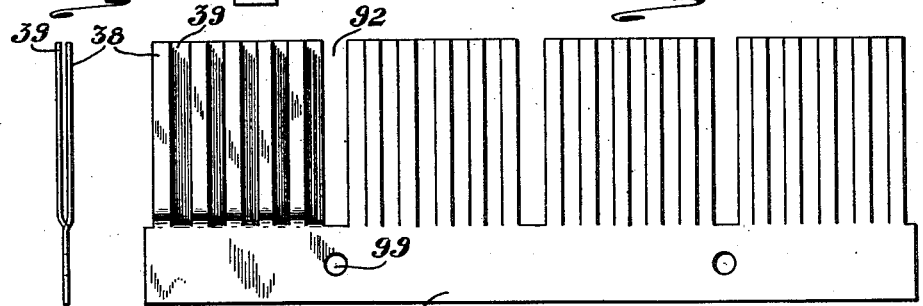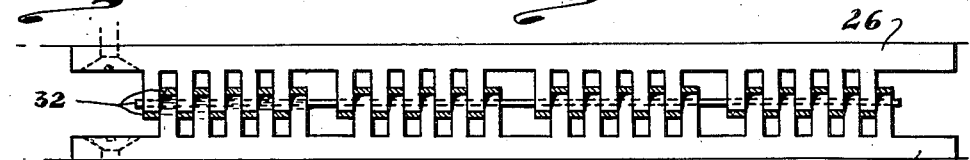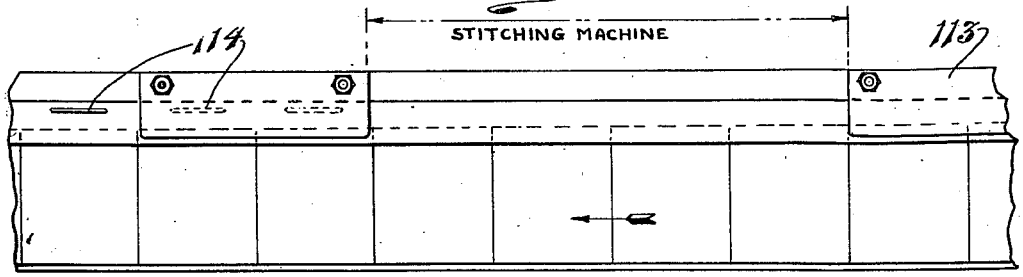

Patented Sept. 20, 1932

1,878,647

UNITED STATES PATENT OFFICE

RUSSELL W. SMITH, OF UNION, NEW JERSEY

APPARATUS FOR MAKING MATCH BOOKS

Application filed June 6, 1928. Serial No. 283,160.

This invention relates to an apparatus for and the method of making book-matches from paper or cardboard.

In my application Serial No. 144,551, filed October 27, 1926, I have shown and described an apparatus and method for producing match sticks from a strip of paper or cardboard, but on this machine, a further operation is required to bind the match strips into binders in order to make the ordinary type of match book. This means additional handling and consequently an increase in the cost of the manufacture of book-matches.

It is therefore the principal object of my invention to provide a machine which will make a complete match book without this subsequent handling required in the manufacture of book-matches according to my previous application and according to the practice which is now prevalent in this art of making book-matches.

Another object of my invention is to provide a machine which, while taking the paper or cardboard from the roll and delivering the complete match book as a finished product, does all of these operations in consecutive order without stopping and starting for each cycle of operation of any part of the apparatus.

Another object of my invention is to provide a complete mechanism which not only delivers the complete book with the match sticks assembled therein, but to provide means for printing the required advertising or other designations on the covers which comprise the binders of the match books.

There will be, to one skilled in this art, various and ancillary objects which will appear from the description which hereinafter follows.

Necessarily, in a mechanism of this character, the detail pieces entering into the whole are many and varied, and I have therefore only illustrated in the drawings certain forms which I have found to be operative in practice. In the drawings accompanying this specification, Figure 1 is a schematic view of the apparatus, showing the various parts of the mechanism in their relative operative positions, whereby a general understanding of the functions of the completely assembled machine may be obtained.

Figure 2 is a side elevation of that part of the mechanism which receives the splint paper and forms the same into match splints, as well as the beginning of the conveyer belt which receives the match splints from the forming press.

This view also shows a part of the paraffin tank into which the ends of the match splints are dipped in the cycle of operations thereof.

Figure 3 is a top plan view of Figure 2, showing in addition the relative position of the drive mechanism extending to the book assembly part of the apparatus, and the relative relation of the conveyer belt carrying the clips for receiving the match splints from the forming press.

Figure 4 is a continuation of Figure 2, it being understood that the left-hand end of Figure 4 matches the right-hand end of Figure 2. Figure 4 shows the right-hand end of the paraffin dipping tank together with the supply reservoir to maintain a constant level in the dipping tank, and means for heating the paraffin. At the right-hand side of Figure 4 is shown the tank for carrying the igniting material which is supplied to the end of the match splints. In the central portion of the figure is shown the intersection of the main conveyer belt bringing the match splints to the book assembly part of the machine.

Figure 5 is a plan view of the machine at the intersecting portion of the splint forming and conveying part and the book assembly portion. At the right of the figure is shown the paper slitting apparatus for slitting the cover paper, and at the left-hand side is shown the folding mechanism, stitcher, and cutting-off apparatus, while in the center of the figure is shown the beginning of the book assembly operating mechanism.

Figure 6 is an enlarged detail view showing the perforating die, the feed sprocket, the shearing die, the offsetting means for staggering the splints, and the cutting-off knives, together with the guide mechanism for guiding the splints into the clips on the conveyer belt as they are ejected by the press carrying the mechanism just described. This view shows the means for separating the splints after they have been transferred to the clips of the conveyer belt.

Figure 8 is a sectional view on the line 8—8 of Figure 2, showing how the paper guides are constructed.

Figure 11 is a view enlarged from the other views, showing a plan of the receiving platform directly in front of the splint conveyer, but with the splint conveyer removed for the sake of clarity. This view also shows how two splint strips are gathered into alignment for the purpose of assembly alignment with the splint cover strip. In this view the ejector mechanism for ejecting the splints from the main conveyer has been omitted.

Figure 12 is a sectional elevation on the line 12—12 of Figure 11 with the ejector mechanism illustrated in part and with the assembly strip feed belt in position.

Figure 13:
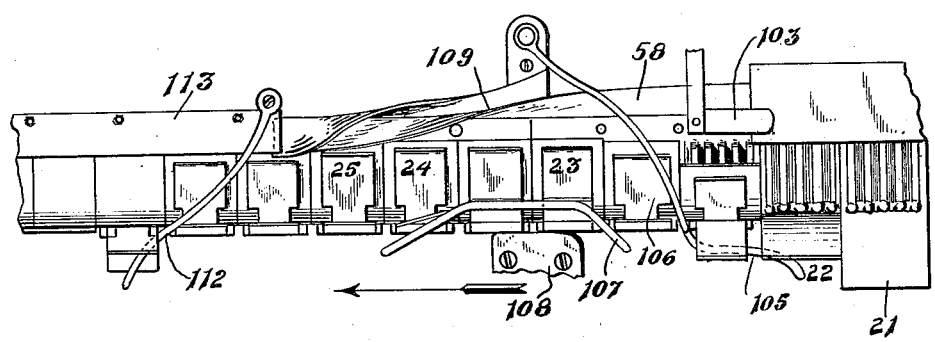

Figure 13 is a plan view of the folding mechanism disassembled from the machine, showing the various steps of operation of the folding means.

Figure 14:
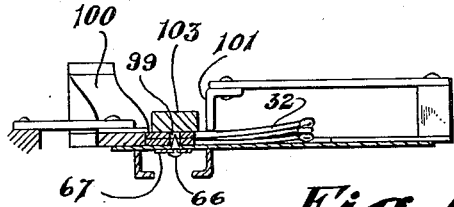

Figure 14 is a section taken on the line 14—14 of Figure 11, showing how the splints are brought into register with the cover paper and also how two strips of splints are depressed into proper position to receive the cover.

Figure 15:
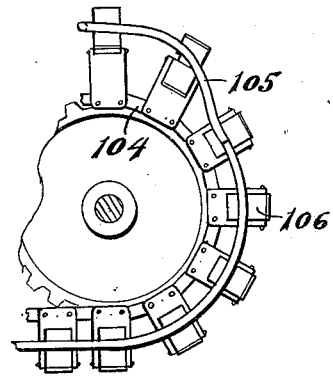

Figure 15 is a partial side elevation of the folding mechanism, as it approaches its operative position and also shows the means for maintaining the folding elements in operative and in inoperative position.

Figure 5:
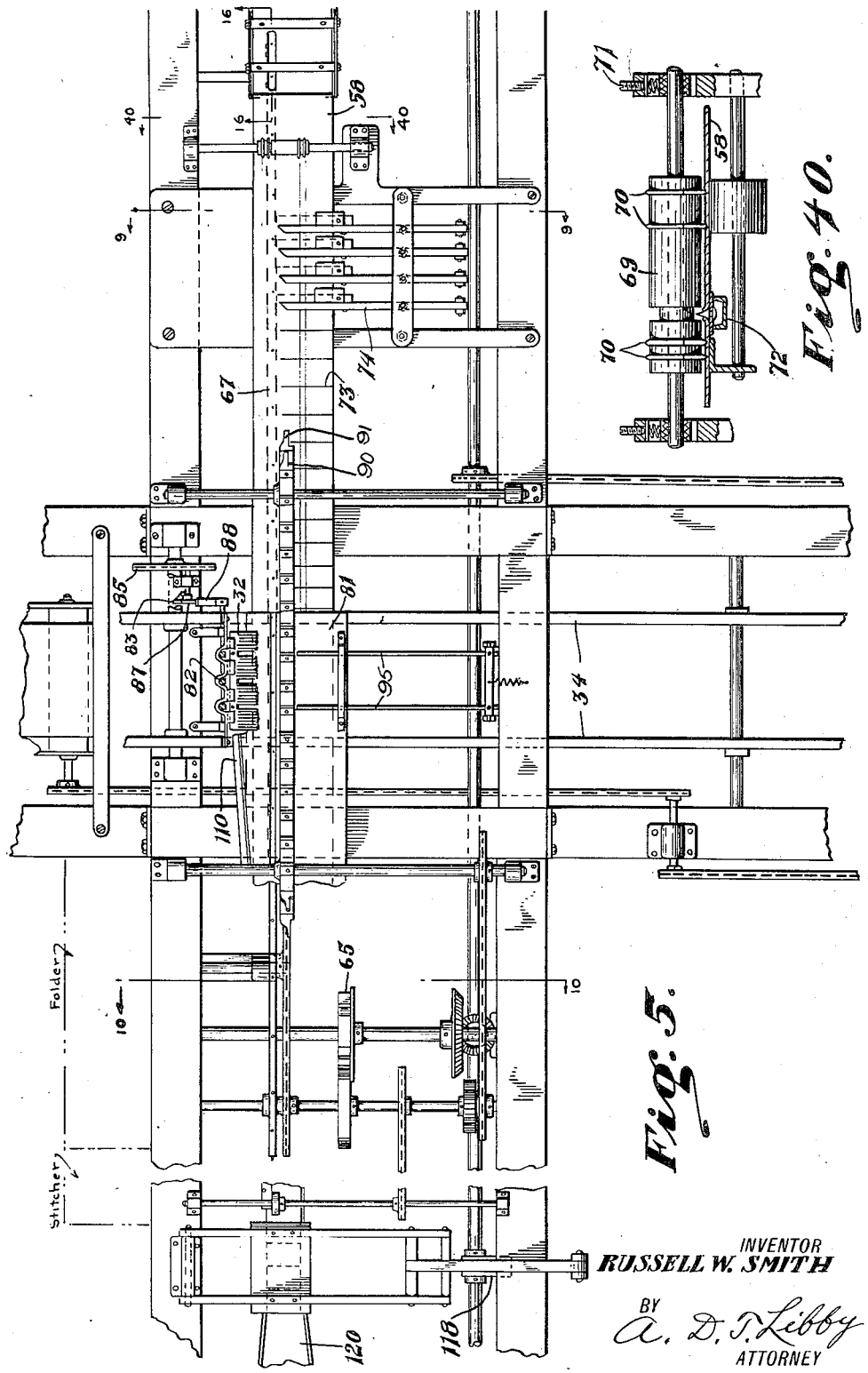
Figure 16:
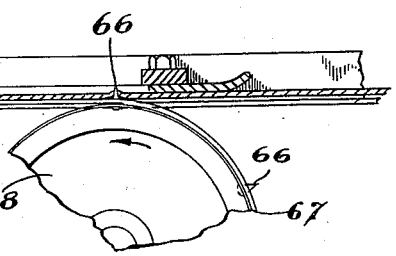

Figure 16 is a sectional view taken on the line 16—16 of Figure 5, and illustrates the manner in which the transverse conveyer becomes associated with the paper cover strip.

Figure 17:
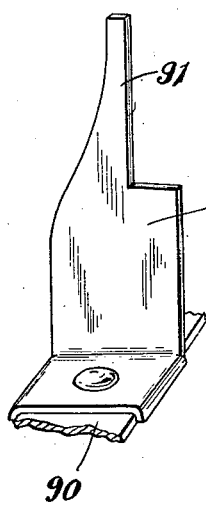

Figure 17 is a perspective view of one of the aligning elements used on the assembly strip feed belt.

Figure 18:
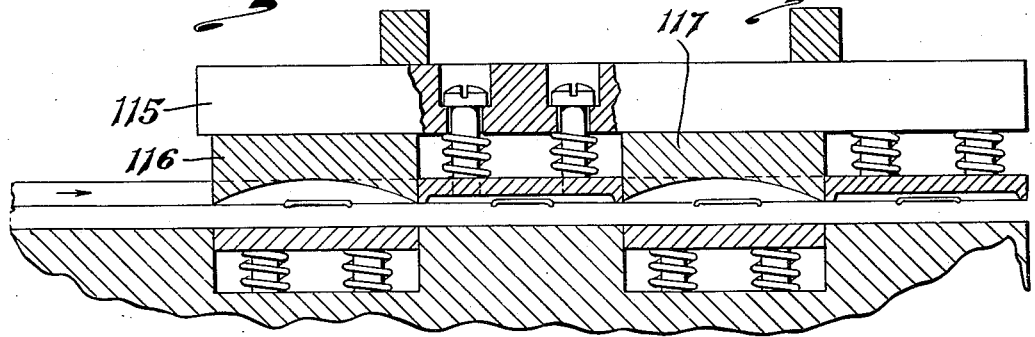

Figure 18 is a cross-sectional view taken through the longitudinal axis of the match book cutters.

Figure 19:
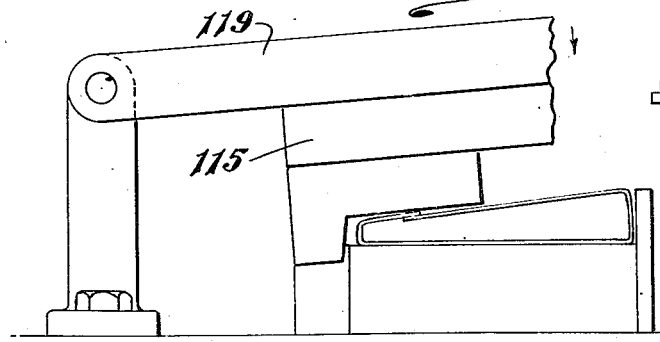

Figure 19 is a part side elevation of the match book cutter.

Figures 9, 10:
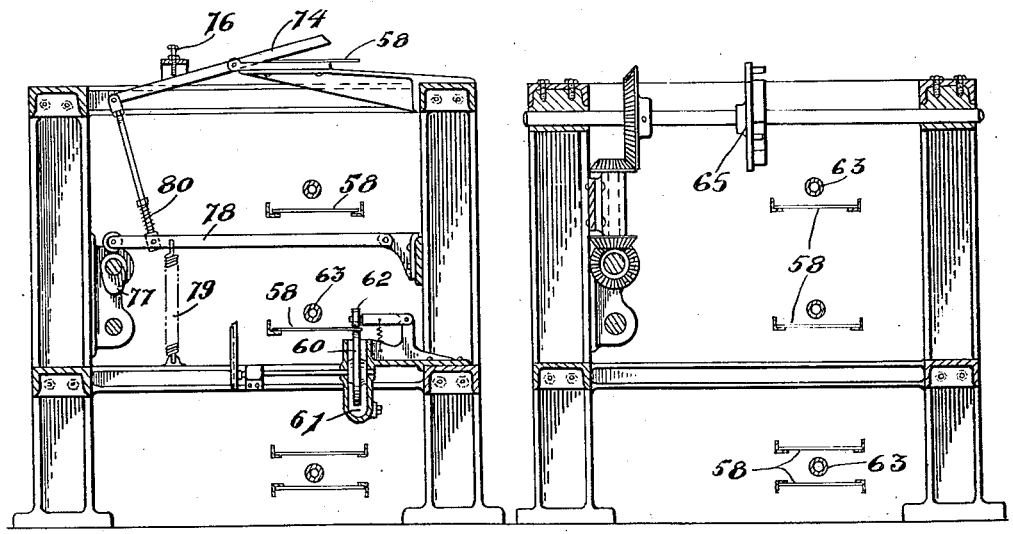
Figure 9 is a sectional view taken on the line 9—9 of Figure 5, showing the operating means for the slitting knives which slit the cover paper to the proper width. This view also shows the means for applying the abrasive to the cover, and the means for driving the abrasive coating means.
Figure 10 is a sectional view on the line 10—10 of Figure 5, and shows the manner in which the drive is brought up to the folding mechanism.
Figure 20:
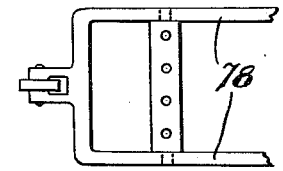

Figure 20 is a detail view of the cam folder arm used on the cutting mechanism shown in Figure 9.

Figures 21 to 25 inclusive, show the different steps of the folding operations produced by the folding mechanism.

Figure 26 is a detail view partly in section and partly in elevation, showing one cover folding element and the manner of securing this element to the chain belt on the drive which carries it.

Figure 27 is a detail view of the ejector mechanism for ejecting the splints from the conveyer to the book assembly apparatus.

Figure 28:
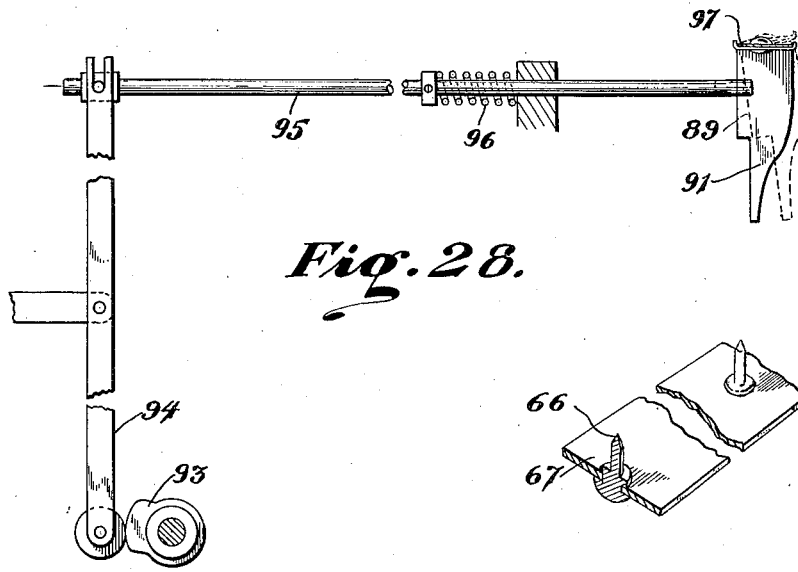

Figure 28 is a detail view illustrating the manner in which the assembly strip feed belt is displaced to align the match splints as they are ejected from the main conveyer belt.

Figure 29:
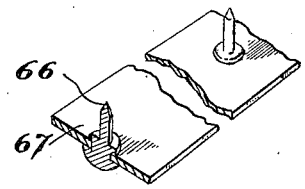

Figure 29 is a fragmentary perspective view of the transverse conveyer belt, showing two of the pins which perforate the cover paper and furnish the motive power for pulling the cover paper through the book assembly part of the machine.

Figure 30:
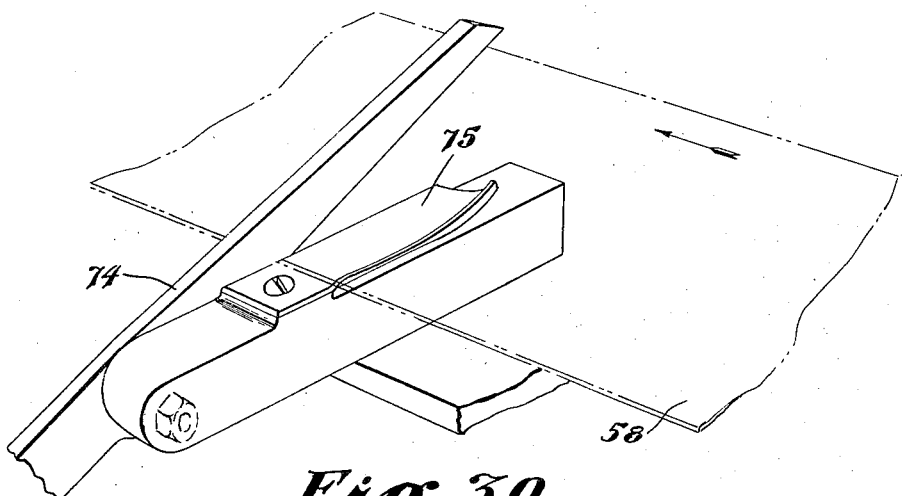

Figure 30 is a perspective view of one of the slitting or shearing knives used for slitting the cover paper and the stripping means associated with it.

Figure 31 is a detail view showing the method of assembly of the splint clips on the conveyer belt, and the means of driving the conveyer belt through the clip attachment means.

Figure 32 is a plan view across the conveyer belt at the point where the splint clips are attached thereto.

Figure 33 is a front elevation of Figure 32.

Figure 34 is a side elevation of one of the individual clips shown in Figures 31, 32, and 33.

Figure 35 is a plan view of a match strip as made by the press and delivered to the main conveyer belt.

Figure 36 is an end view of Figure 35.

Figure 6:
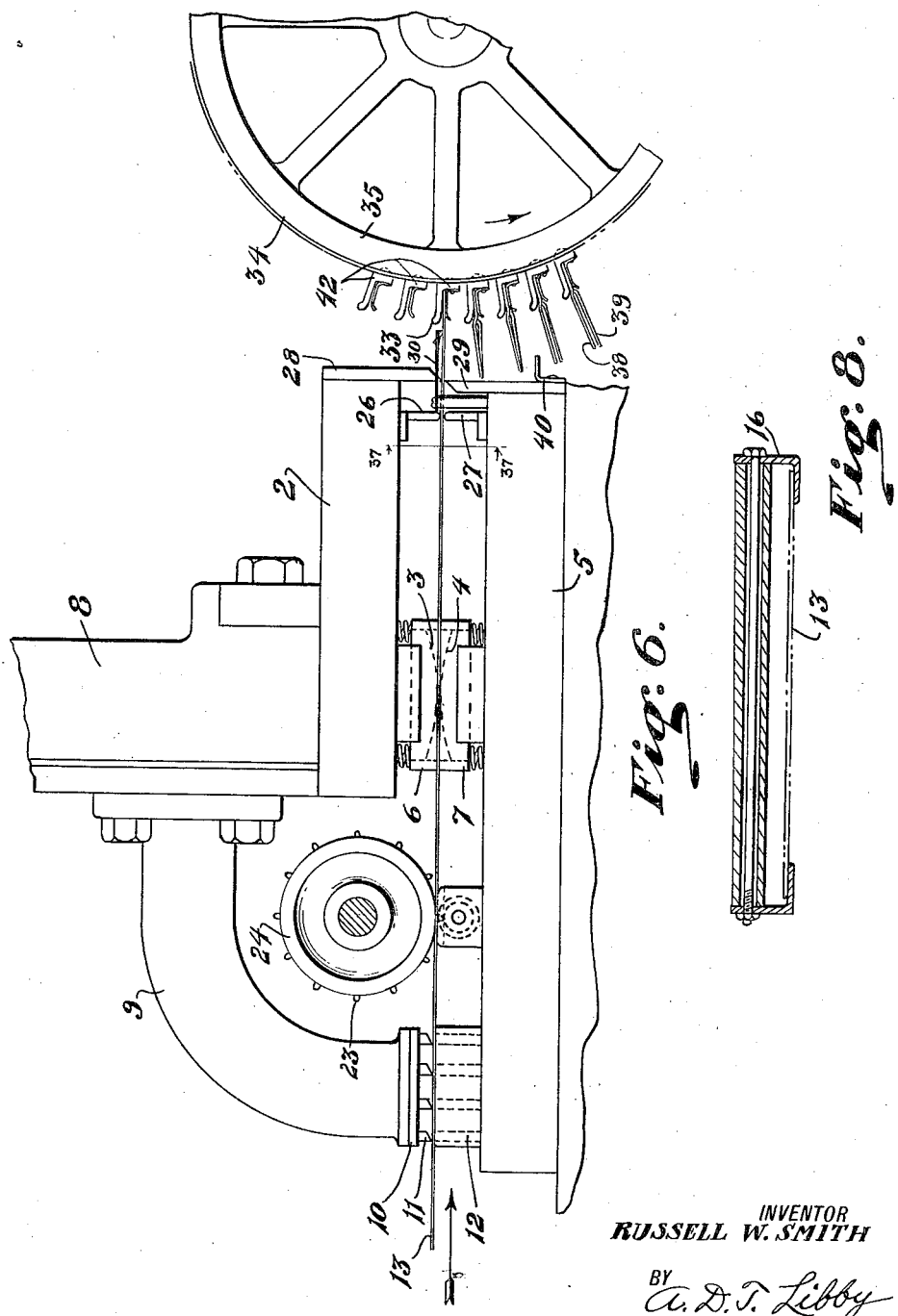

Figure 37 is a view taken on the line 37—37 of Figure 6.

Figure 38 is a plan view of the chute for passing the match books to and from the stitching mechanism (not shown).

Figure 39:
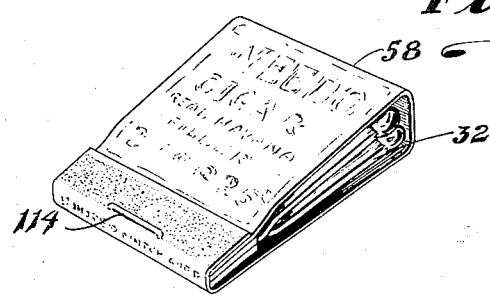

Figure 39 is a perspective view of the finished match book.

Figure 40 is a sectional view taken on the line 40—40 of Figure 5.

Figure 41 is a plan view of the match splint separator.

Figure 1:
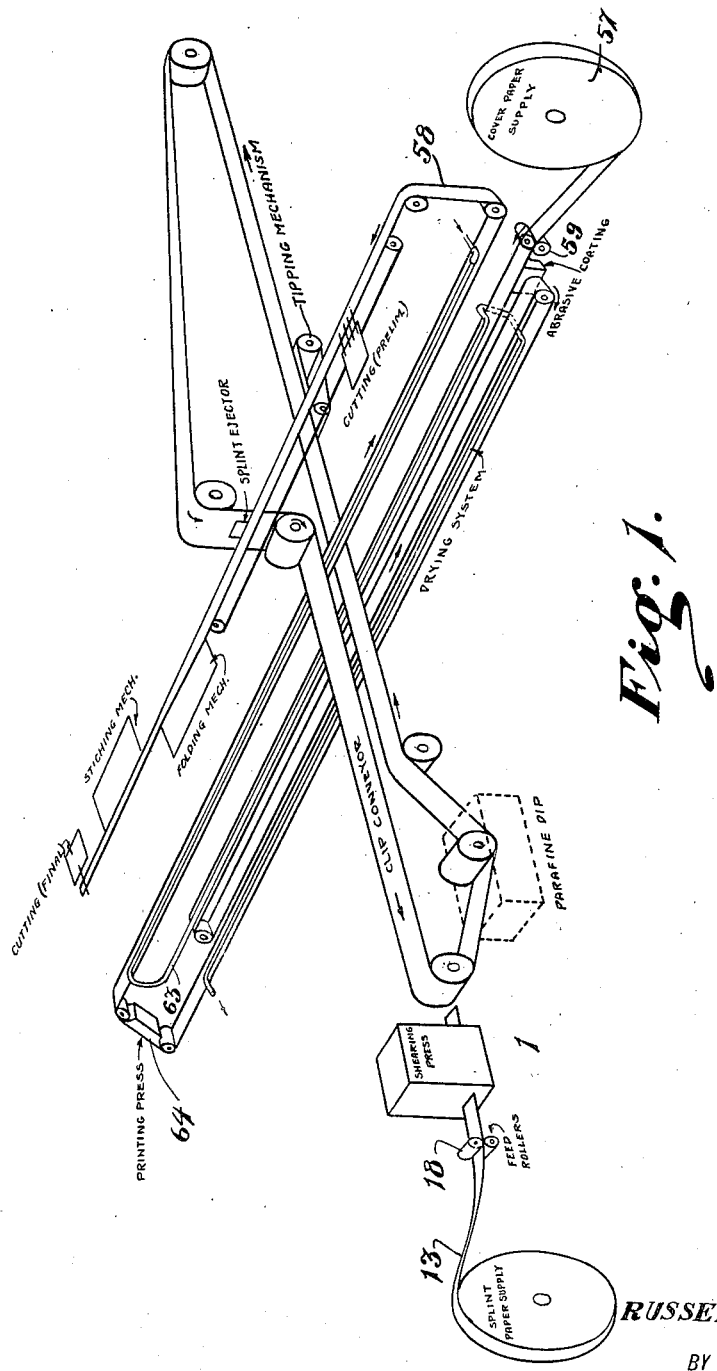

Before describing in detail the various parts of the apparatus, reference should be had to Figure 1, which shows at the extreme left, a roll of paper from which the match splints are made. The paper passes through feed rolls and a shearing press which forms the match splints in the form of strips. From the shearing press the match strips are passed to a conveyer having assembled thereon a plurality of clips which receive the match strips as they are ejected from the press. The match strips are then conveyed through a paraffin bath and thence to a reservoir containing igniting material. The match strips are then air dried on the conveyer in its travel as shown in Fig. 1 and brought back to the book assembly part of the mechanism.

While the above operations have been going on with respect to the forming of the match strips, another part of the mechanism shown in Figure 1, as mounted at right angles to the first mentioned part, is preparing the cover paper by applying an abrasive coating to one edge of the cover paper strip, partially drying this coating, and then printing suitable advertising or other indicia on the strip, and then completing the drying of the covers, after which the paper strip forming these covers is suitably slitted and prepared to receive the match splint strips as they are brought to the assembly portion of the apparatus by the conveyer belt previously described.

After the match strips have been assembled in their respective covers, these covers are folded and the books passed on to the stitching mechanism and finally to the cutting-off devices which cut the strips into individual books which drop into a container ready for distribution.

Referring now particularly to the details, wherein like numbers correspond to the same parts in the various views:

1 is a shearing press having a bolster plate 2 carrying a punch 3, which cooperates with the die 4 carried on a bed plate 5. The punch and die members are provided respectively with strippers 6 and 7. The movable member 8 operated by the crank of the press has an arm 9 which carries a perforating die 10 having a series of punches 11 cooperating with a lower die member 12 for perforating the paper strip 13 as this comes from a roll 14 which is carried on any suitable frame support 15. After the strip of paper 13 leaves the roll 14, it passes over a tension device 16, a section of which is shown in Figure 8, which is pivoted at 17, so that as the roll of paper decreases in size, the tension device carrying the roller 31 functions to maintain substantially the same tension on the strip 13.

Figure 7:
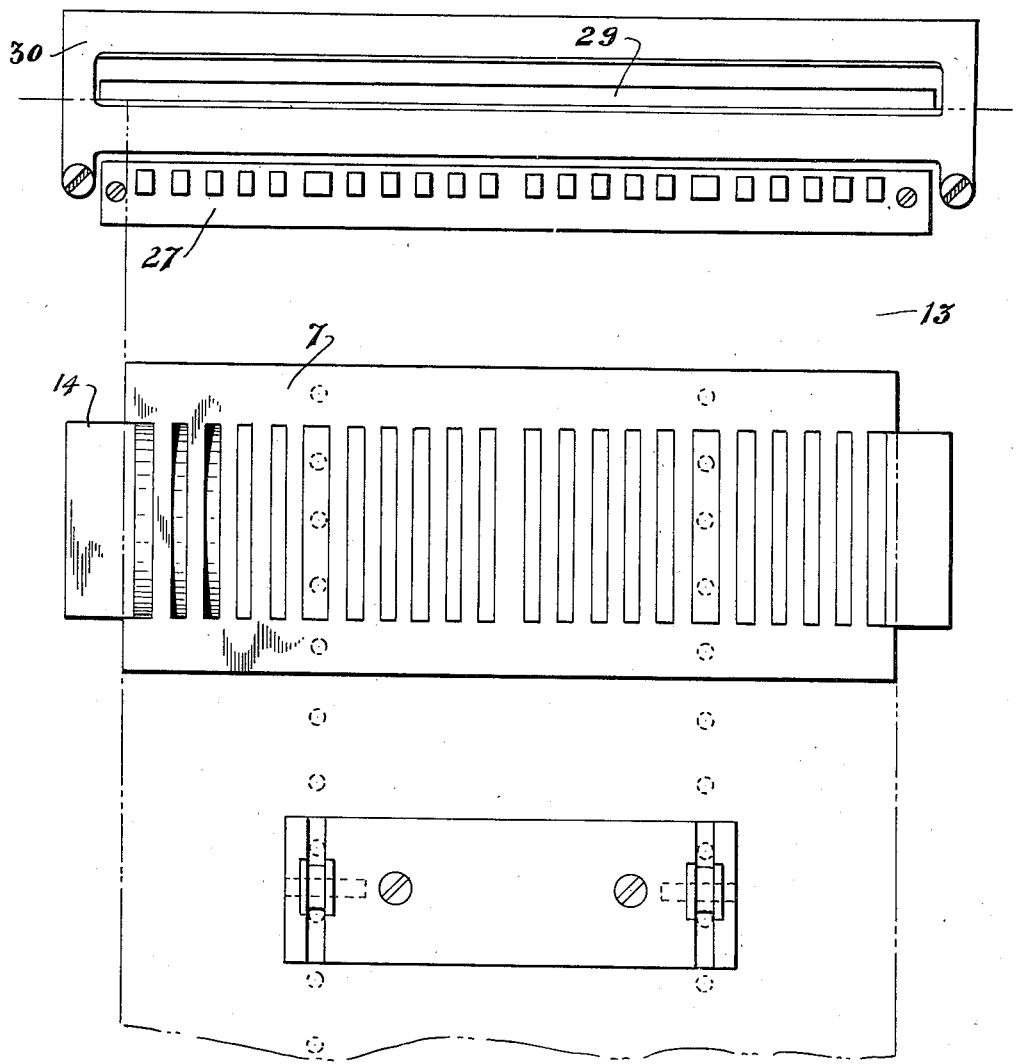
Figure 7 is a plan view of a portion of the lower half of the die shown in Figure 6 with a sheet of splint paper shown by imaginary lines.

After leaving the tension device, the strip of paper 13 passes between feed rolls 18 which are suitably supported in a yieldable support 19. The feed rolls are operated in any suitable manner from the press as by means of a chain 20. After leaving the feed rolls, the splint paper strip 13 passes through a secondary tension device 21 which is adjustable by a tension nut 22. After passing the secondary tension device 21, the strip 13 enters between the die members 11 and 12 and is perforated with two rows of holes adjacent the opposite sides of the strip 13. These holes are so spaced as to cooperate with the pins 23 carried on a sprocket 24 which is intermittently driven through a Geneva gear movement 25 operated by a rotatable member of the press, which in turn is driven by an electric motor or other suitable means. At the same time, the strip 13 also enters between the punches 3 and 4 which form the match strip as shown in Fig. 35, including the slots 92 to be later referred to. The bolster plate 2 and the bed plate 5 carry respective offsetting members 26 and 27 which are shown more in detail in Figure 37. The bolster plate 2 and the bed plate 5 also carry cooperating shearing knives 28 and 29 and provided thereupon, is a guide member 30 shown more clearly in Figure 7. It is to be remembered that the intermittent movement of the wheel 24 takes place when the die members 3 and 4, as well as the punch members 10 and 12, are separated, in order to feed the strip 13 through into position for the next sequence of operation of these punch members. This also applies to the separating members 26 and 27, as well as the shearing knives 28 and 29; that is to say, when the parts are in position as shown in Figure 6, the drive wheel 24 is in a position to force the match strip 13 forwardly so as to insert the match splint 32 shown in Figure 35 forward to a row of clips 33, mounted on a conveyer belt 34. The conveyer belt 34 which is shown in plan view of Figure 3, is operated by a sprocket wheel 35 driven by a drive sprocket 36, which in turn is driven through a chain 37 from the press 1.

It is to be understood that the conveyer 34 has a continuous and substantially uniform motion, and its movement is so timed with respect to the operations of the press, that the match strip 32 is ejected from the press into the clip 33 just at the time when the clip 33 is brought opposite to the shearing knives 28 and 29.

Due to the shearing operation of the shearing knives 28 and 29, there is a tendency for the individual match splints 38 and 39 to become frictionally interlocked, and to separate these to the position shown in Figure 36, it is necessary to provide some separating means. This separating means is indicated at 40 and shown in detail in Figure 41, and comprises a serrated plate which engages alternate splints as the match strips are carried on the conveyer in the direction of the arrow as shown in Figure 6.

The main conveyer belt 34 is made up of side members 41 preferably made out of strip spring steel. Mounted between the strips 41, are cross-spring clip carrying members 42 which are in spaced relation to one another, as more plainly indicated in Figures 2 and 6. Associated with the members 42 are spring clip members generally referred to by the numeral 33. These clips are composed of two elements, one of which, 43, is preferably made of spring steel. The clip elements have their ends deflected so as to leave a throat 44 to receive the edge of the match strip 32. The two rivets 45 and 46 which secure the members 42 to the members 41, are provided with heads 47 which enter depressions in the sprocket wheel 35 for the purpose of driving the conveyer belt. The strips 42 are formed with depressions 48 to receive the match strip ejector fingers which will be later referred to.

In order that the conveyer belt 34 may be properly rotated with the press 1, I have provided an adjusting device 49 (see Fig. 2) which consists of preferably a pair of spaced screw studs co-acting between the frame of the press and the frame carrying the conveyor by which this rotation can be properly brought about, so that the relative distance between the conveyer belt and the press may be slightly varied to insure the proper transfer of the match strips from the press to the conveyer belt. Associated with the conveyer belt, is a tank 50 partially filled with paraffin 51, into which the ends of the match splints are dipped, as shown in Figure 2. The object of the paraffin is to saturate the ends of the splints so as to make them burn more readily.

Figure 4:
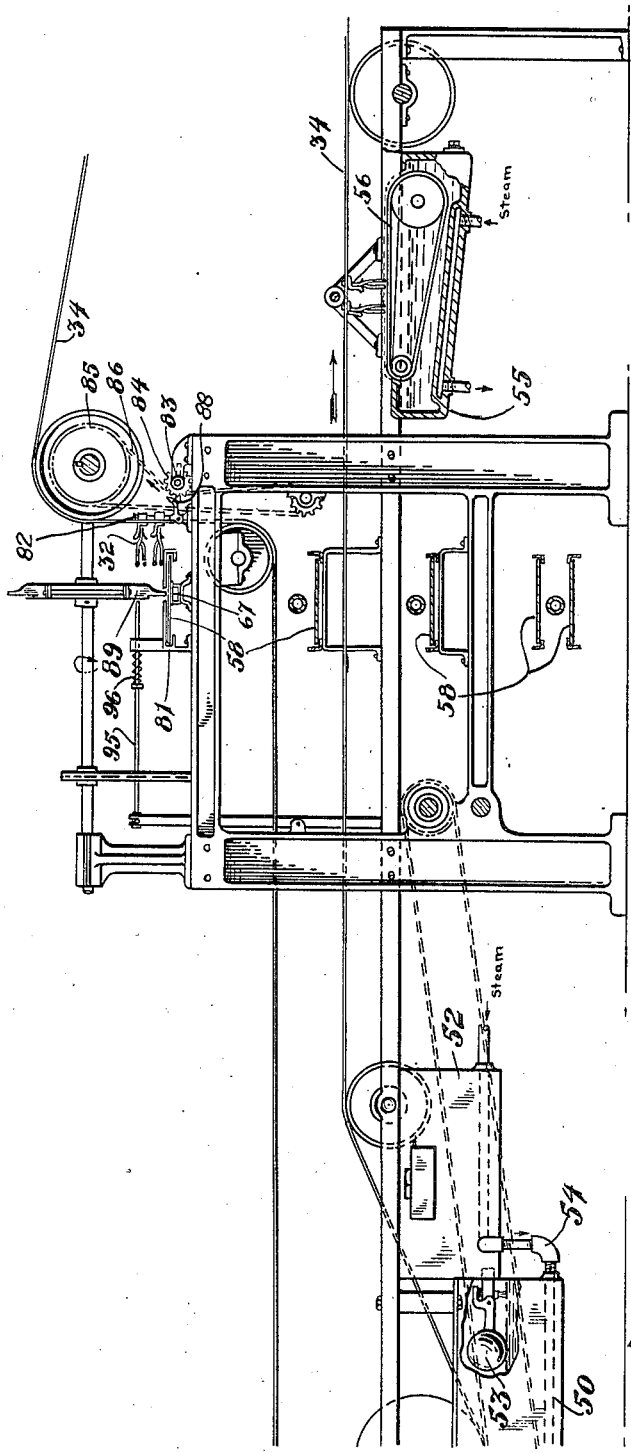

Associated with the paraffin tank 50, is a reservoir 52 for carrying the supply of the paraffin, which is automatically fed by means of the valve 53 to the tank 50. In order to keep the paraffin at the proper temperature, the reservoir and the tank may be supplied with any means of heating, as for example, steam pipes 54. After the match strips leave the paraffin tank, they are carried forward to a dipping tank 55 which contains the igniting material in liquid form into which the ends of the match splints are dipped, as shown in Figure 4. Tank 55 has a conveyer belt 56 for bringing the material in the tank upward into cooperation with the ends of the match splints, and these are dipped substantially in the same manner as described in my application previously referred to, and no further description will be given of this detail.

The match strips are then carried forward on the conveyer 34 and dried, the drying apparatus not being indicated on the drawings. After passing through the drying process, the match strips are brought back by the conveyer 34 to the book-making assembly part of the mechanism. The book assembly part of the mechanism is arranged substantially at right angles to that part of the mechanism which has been previously described. This is shown particularly in Figures 1 and 5.

Starting with the cover paper supply, this is on a roll 57 similar to roll 14 shown in Fig. 2. As the paper strip 58 is withdrawn from the roll 57, it passes between a pair of feed rolls 59. Directly thereafter, the paper strip 58 passes into cooperation with a device for applying an abrasive coating to one edge of the paper strip. This apparatus for applying the abrasive coating, is indicated in the form of a wheel 60 (see Fig. 9) which is in operative relation to a supply tank 61 carrying the abrasive material in liquid form. A roller 62 is used to hold the strip of paper 58 in contact with the abrasive applying roller 60. This abrasive coating is of course utilized for igniting the matches when they are used.

After the abrasive material has been applied, the strip of cover paper 58 is carried or threaded through the machine on suitable rollers and dried in any satisfactory manner as by steam pipes 63. During the time while the abrasive material is being dried, the strip of paper passes through a printing press 64 (see Fig. 1) and suitable printing matter is applied thereto and the drying process further continued by which the drying of the abrasive material is completed and the printed matter is also dried. It is to be understood that the movement of this cover paper strip through the machine is intermittent, being operated by a suitable gearing such as a Geneva movement 65 (see Figs. 5 and 10) to cooperate with the rest of the machine to be later referred to.

After the drying has been sufficiently completed, the cover paper strip 58 is brought by the drive rollers to the upper part of the machine and perforated by coming into contact with the pins 66 secured to the transverse conveyer belt 67 constructed as shown in Fig. 2, of any suitable material, and which belt is operated by the sprocket wheel 68 (see Fig. 16). The pins 66 in addition to perforating the cover paper strip 58, act as motive power for carrying the strip 58 through the book assembly part of the mechanism.

Directly after the paper strip 58 has been perforated as described, it is brought under a creasing roller 69 (see Fig. 40), having creasing ribs 70 thereon and which is frictionally operated by movement of the paper strip 58. The creasing ribs 70 cause a slight fibre fracture in the paper strip 58 for facilitating the folding of the paper strip at the proper places. As shown in Figure 40, the amount of the creasing can be regulated by means of the adjusting screws 71. It may be noted in passing, that the transverse conveyer belt is supported by a support member 72 which is channel-shaped to allow the free passing of the rivet head of the pins 66.

After passing the creasing means just described, the cover strip is slitted along the lines 73 by means of shears 74. Four of these shears are indicated, because of the fact that the cross-conveyer belt has a certain length of movement for each movement of this part of the machine, due to the fact that the splint strip shown in Figure 35 is made in four sections. Of course the number of these shears may be varied in accordance with the number of sections in the splint strips.

Associated with the shears 74, is a stripper 75 and the stroke of the shear 74 by which the length of the slit is regulated, can be adjusted by an adjusting screw 76 (see Figs. 9 and 30). Each of the shears 74 is operated in any satisfactory manner as by means of a cam 77 acting on a cam follower carried by lever 78 which is normally held by spring 79, so the cam follower is in engagement with the cam. The shears 74 are yieldably connected to the lever 78 by means of a yielding device 80.

After the paper cover strip has been slit as just described, it is carried forward by the transverse feed belt 67 to a point underneath the match splint receiving platform 81 constructed as shown in Figs. 4 and 11, and directly in front of the conveyer belt 34 as this turns downward at this part of the machine (see Fig. 4). As the match strips 32 are brought forward by the conveyer belt 34 (see Figs. 4 and 12) to a point opposite the platform 81 and in a plane normal thereto, the ejector fingers 82 which are now positioned in the depressions 48 of the conveyer belt which is going downward in a plane behind them, are operated through the medium of a shaft 83 operated by an idler sprocket 84 driven by a sprocket 85 and chain 86. The shaft 83 carries a pin 87 which in turn engages a lever arm 88 that causes the ejector arms 82 to move in the direction of the arrow (Fig. 27) to push the splints 32 out of the clips 43. As shown in Figure 27, two strips of splints 32 are pushed out of the clips of the conveyer simultaneously and on to the platform 81. Immediately after ejecting the two strips of splints, the fingers 82 are returned to normal position, whereby they are ready to enter depressions 48 behind the next two strips of splints as the conveyor moves downwardly behind the fingers 82. This will be clear by reference to Figures 4, 5, 12, 27, and 33. Cooperating with the ejector fingers 82—2 in number for the length of splint herein described—are a plurality of aligning elements 89 (Fig. 28) carried on any suitable means as by steel belt 90 driven by suitable sprockets (see Fig. 5). The aligning members 89 and fingers 91 are adapted to enter the slots 92 in the match strip 32 just prior to the ejectment of the match strip 32 from the conveyer belt. This is accomplished by means of a camp 93 carried on a suitable driving shaft acting on a lever 94 to which is connected a push rod 95 which is resiliently held in position by a spring 96. The position of the fingers 91 which they occupy when in the slots 92, is indicated by the dotted line in Figure 28. To accomplish this, the belt 90 is made of flexible steel so that it may be twisted or displaced in its position. These fingers 91 insure that the two match strips 32 which are simultaneously ejected from the conveyer belt are in proper alignment on the cover plate with each other and with the cover strip which runs underneath the platform 81 as has been described.

The fingers 91 traveling in the direction of the arrow (see Fig. 12) on the assembly strip feed belt 97, now act to move the two strips 32 which are now one above the other, forward concurrently and in time with the cover strip 58 which is directly below it (see Fig. 11). As the strips 32 are brought forward, they enter into a tapered throat 98 which forms the entrance to an aligning passage preparatory to bringing the strips into position so that the pins 66 on belt 67 will enter the holes 99 which were previously formed in the strip 35 by the perforating pins 10 of the press. It is thus seen that the holes 99 serve two functions—first, by this means the match strip 13 may be drawn through the press, and second, they are utilized for the purpose of assembly in the covers which will now be described.

Cooperating with the strip 100 which forms the throat 98, is a tapered strip 101 (see Fig. 14) that acts to gradually compress the two strips 32 as they are moved forward underneath the members 100 and 101. At the point 102, substantially full compression of the two match strips is obtained and the compression strip 103 fully insures that the holes 99 in the strips 32 register with the pin 66 in the cross conveyer belt 67. At the point 102 (Fig. 11) the match strips 32 are leaving the match strip receiving platform 81 and are passed into intimate contact with the cover strip 58 and as shown in Figure 13, the application of the cover is about to begin.

The folding apparatus by which the cover strip 58 is applied to the match strips 32, is illustrated in Figures 13, 14, and 15, and in Figures 21 to 25 inclusive. A chain 104 operated by a rotatable driving sprocket (see Fig. 15) carries the folding mechanism which comprises a plurality of folding members which are L-shaped and which may be adapted to oscillate on their pivot mountings 180° (see Figs. 15, and 21 to 26). These folding members are progressively brought into operation by means of linear cams, the first of which is shown at 105, and which starts the folding members into operation and accomplishes the movement as shown in Figure 22. The cam 105 progressively moves the folding members 106 from the position shown in Figure 21 to the position shown in Figure 22. As the belt 104 moves forward, a second cam 107, is brought into operation which moves the cover strip to the position shown in Figure 23 at which point the bracket member 108 helps to square the corners of the cover plate as shown in Figure 22. While the operations just mentioned have been taking place, the back edge of the cover paper is entering a twisted throat 109 formed by suitable pieces of metal twisted to the formation substantially as indicated in Figure 13, so that when the positions 24 and 25 are reached, the end 110 is folded down as shown in Figure 25, thereby holding the cover end 111 of the book beneath it.

Another cam 112 turns the members 106 back to their original position as shown in Figure 26. The strip 113 holds the books in the position shown in Figure 25 preparatory to being stitched as shown in Figure 38. The details of the stitching machine are not shown, as I utilize a machine which is specially constructed for this purpose, but the details of which form no part of my present invention, and therefore will not be described further, but the space which this part of the mechanism occupies, is shown relatively in Figure 38. Three of these stitches are shown at 114, one in each book of matches.

This continuous strip which has been coming through the machine is now ready to be cut up into individual match books, and the mechanism for doing this is illustrated in Figures 18 and 19, and in Figure 5. By reference to Figure 18, it will be seen that there are four books traveling in the direction of the arrow. A bolster plate 115 is provided which carries dies 116 and 117, and these are operated by any suitable mechanism as by a cam 118 operating in a satisfactory manner, which cam operates on the arm 119 moving it downward in the direction of the arrow (Fig. 19) which causes the dies 116 and 117 to shear the strip into four books corresponding in number to those operated on by the book-forming part of the machine. Immediately upon the release of the die, the oncoming strip through the machine pushes the severed books from the die into a suitable container or chute 120, ready for packing. The finished book is shown in Figure 39.

It will be clearly apparent from the description, that the details entering into the make-up of a machine of this character may be varied over a very wide range, and I therefore do not want to be limited to the precise details as shown herein, as they are merely illustrative of the general principles involved in carrying my invention into practice.

Having thus described my invention, what I claim is:

1. A match book making machine comprising; mechanism for forming the match splint strips from cardboard or the like, mechanism including a single conveyor for dipping the splint strips into inflammable material and for tipping said match splints with an igniting compound and drying said splints while on said conveyor, mechanism for forming a book cover complete, including the addition of abrasive material and printing matter if required, for the splints and mechanism for uniting said splint strips and covers into complete match books.

2. A match book making machine comprising; mechanism for forming the match splint strips from cardboard or the like, mechanism including a single conveyor for dipping the splint strips into inflammable material and for tipping said match splints with an igniting compound and drying said splints while on said conveyor, mechanism for forming a book cover complete for the splints and applying an abrasive material on a part of the cover and printing the same and mechanism for combining and then stitching the splint strips and covers into complete match books.

3. A match book making machine comprising; mechanism for forming the match splint strips from cardboard or the like, mechanism including a single conveyor for dipping the splint strips into inflammable material and for tipping said match splints with an igniting compound and drying said splints while on said conveyor, mechanism for forming a book cover for the splints, means for printing suitable inscriptions on said covers, means for applying an abrasive material to the covers, means for drying said covers and mechanism for uniting said splint strips and covers into complete match books.

4. A match book making machine comprising; mechanism for forming the match splint strips from cardboard or the like, mechanism for tipping said match splints with an igniting compound and drying said splints, means for securing synchronous operation between said mechanisms, mechanism for forming a book cover, including the printing and application of abrasive material thereon and drying the same, and mechanism for uniting the splint strips and covers, means for cutting the assembled strips into individual books and means for co-ordinating the operation of said latter mentioned mechanism to correspond with the steps of the first two mentioned mechanisms.

5. In a complete match book machine for making; the match splints, the covers with printing and abrasive material thereon and assembling the splints and covers automatically as they are prepared; means included in the splint making part of the machine for perforating the material from which said splints are to be made, means in the splint making part of the machine cooperating with said perforations to draw the material through that part of the machine, means for forming the material into splints and splint strips, means for conveying the splint strips to the assembly part of the machine, tipping and then drying them on the way, and means on the assembly part of the machine cooperating with the same perforations for assisting in moving the separated splint strips through the assembly part of the machine.

6. In a complete match book machine for making; the match splints, the covers with printing and abrasive material thereon and assembling the splints and covers automatically as they are prepared; means included in the splint making part of the machine for perforating the material from which said splints are to be made, means in the splint making part of the machine cooperating with said perforations to draw the material through that part of the machine, means for forming the material into match splints arranged in a plurality of groups separated by slots formed in the material, means for cutting off said material to form splint strips, a conveyer to receive said strips as they are cut off, said conveyer carrying the splint strips to the assembly part of the machine, tipping and then drying means cooperating with the conveyer to tip and dry the splints on their way to the assembly part of the machine, means to pass the splint strip from the conveyer to the assembly means, means on the assembly part of the machine cooperating with said slots to align the splint strips as they are removed from the conveyer and to start the strips on their movement through the assembly operations, and means on the assembly part of the machine cooperating with the same perforations for assisting in moving the separated splint strips through the assembly part of the machine.

7. In a complete match book machine for making; the match splints, the covers with printing and abrasive material thereon and assembling the splints and covers automatically as they are prepared; means included in the splint making part of the machine for first perforating and then slotting the material while forming the splints in groups, means cooperating with said perforations for the purpose of passing the material through the splint making part of the machine and further means on the assembly part of the machine cooperating with said perforations for moving the splint strips in unison with the cover strip through the assembly part of the machine, means cooperating with said slots for bringing the splint strips into alignment after they are moved to the assembly part of the machine and further means cooperating with said slots for starting the movement of the splint strips through the assembly operations with the cover strip.

8. In a complete match book machine, a part for making the match splints in strips, a part for making the book covers complete, including the addition of abrasive material and printing as required, and assembling them with the splint strips, and a conveyer for bringing the match splints from the first-mentioned part to the second-mentioned part, means cooperating with the conveyer for tipping the splints, said splints being retained on said conveyor while being dried, means for driving the conveyer continuously, and means for insuring that it is properly timed with the part making the splint strips.

9. In a complete match book machine, a part for making the match splints in strips, a part for making the book covers complete, including the addition of abrasive material and printing as required, and assembling them with the splint strips, and a conveyer for bringing the match splints from the first-mentioned part to the second-mentioned part, means cooperating with the conveyer for tipping the splints, said splints being retained on said conveyor while being dried, said conveyer comprising longitudinal strips of spring steel having cross-members symmetrically spaced and provided with spring clips for receiving the splint strips as they are ejected by the splint strip making part of the machine, and means for adjusting the conveyer so as to insure the proper transfer of the splint strips to the clips on the conveyer.

10. In a complete match book machine, a part for making the match splints in strips, a part for making the book covers complete, including the addition of abrasive material and printing as required, and assembling them with the splint strips, and a conveyer for bringing the match splints from the first-mentioned part to the second-mentioned part, means cooperating with the conveyer for tipping the splints, said splints being retained on said conveyor while being dried, said conveyer comprising longitudinal strips of spring steel having cross-members symmetrically spaced and provided with spring clips for receiving the splint strips as they are ejected by the splint strip making part of the machine, said cross-members having depressions therein to receive ejector fingers associated with the book assembly part of the machine.

11. In a complete match book machine, a part for making the match splints in strips, a part for making the book covers complete, including the addition of abrasive material and printing as required, and assembling them with the splint strips, and a conveyer for bringing the match splints from the first-mentioned part to the second-mentioned part, means cooperating with the conveyer for tipping the splints, said splints being retained on said conveyor while being dried, said conveyer comprising longitudinal strips of spring steel having cross-members symmetrically spaced and provided with spring clips for receiving the splint strips as they are ejected by the splint strip making part of the machine, said cross-members being fastened to said longitudinal strips by members having heads protruding from the bottom side of said strips and a sprocket wheel having depressions therein for receiving said heads for driving the conveyer.

12. In a complete match book machine, a part for making the match splints in strips, a part for making the book covers complete, including the addition of abrasive material and printing as required, and assembling them with the splint strips, and a conveyer for bringing the match splints from the first-mentioned part to the second-mentioned part, means cooperating with the conveyer for tipping and drying the splints while on said conveyor, said conveyer comprising longitudinal strips of spring steel having cross-members symmetrically spaced and provided with spring clips for receiving the splint strips as they are ejected by the splint strip making part of the machine, said cross-members being fastened to said longitudinal strips by members having heads protruding from the bottom side of said strips and a sprocket wheel having depressions therein for receiving said heads for driving the conveyer, said cross-members also having depressions therein to receive ejector fingers associated with the book assembly part of the machine.

13. In a complete match book machine, a part for making the match splints in strips, a part for making the book covers complete, including the addition of abrasive material and printing as required, and assembling them with the splint strips, and a conveyer for bringing the match splints from the first-mentioned part to the second-mentioned part, means cooperating with the conveyer for tipping and drying the splints while on said conveyor, and means for insuring that the splint ends are separated after the splint strips have been moved to the conveyer and before the tipping operations begin.

14. In a complete match book machine, a part for making the match splints in strips, a part for making the book covers complete, including the addition of abrasive material and printing as required, and assembling them with the splint strips, and a conveyer for bringing the match splints from the first-mentioned part to the second-mentioned part, means cooperating with the conveyer for tipping the splints, said splints being retained on said conveyor while being dried, and a serrated plate positioned so as to engage alternate splints to break any interlock between adjacent splints as the splint strips are carried forward by the conveyer toward the tipping mechanism.

15. In a complete match book machine, a part for making the match splints in strips, a part for making the book covers complete, including the addition of abrasive material and printing as required, and assembling them with the splint strips, a continuously moving conveyer for receiving the splint strips from said first-mentioned part, means cooperating with the conveyer to tip the splints, said splints being retained on said conveyor while being dried while on the conveyer, and means for moving the cover strip through the machine in intermittent steps timed to the movement of said conveyer as and for the purposes described.

16. In a complete match book machine, a part for making the match splints in strips, a part for making the book covers and assembling them with the splint strips, a conveyer for receiving the splint strips from said first mentioned part in substantially uniform relationship and for moving them to the assembly part of the machine, means for tipping the splints, means for drying the splint ends while on the conveyer, means for slitting the cover strip and means for moving the cover strip through the machine in intermittent steps so as to bring the slitted cover strip to the assembly point at the proper time for assembly with the splint strips.

17. In a complete match book machine, a part for making the match splints in groups on a strip, a part for making the covers including; means for putting an abrasive material on a portion of the cover strip, means for printing on the cover strip, means for drying the abrasive material and the printing, means for perforating the cover strip, means for creasing the cover strip for assisting in folding the covers, means for slitting the cover strip a desired distance for the individual covers, means for moving the slitted cover strip forward for the assembly operations, a conveyer for bringing the splint strips from the part making them to a point adjacent said slitted cover strip, means for tipping the match splints while on said conveyer, a receiving platform, means for ejecting the splint strips from the conveyer to the platform, means for aligning said splint strips, means for moving said splint strips forward in the direction of movement of the cover strip, means for passing the splint strips onto the cover strip so the groups of match splints are properly positioned with respect to the slitted parts of the cover strip which is to form covers for said groups, means for folding the slitted covers on said creases over their corresponding groups of splints, means for stitching the covers and match groups together and means for severing the groups into individual match books.

18. In a complete match book machine, a part for making the match splints in groups on a strip, a part for making the covers including; means for putting an abrasive material on a portion of the cover strip, means for printing on the cover strip, means for drying the abrasive material and the printing, means for perforating the cover strip, means for creasing the cover strip for assisting in folding the covers, means for slitting the cover strip a desired distance for the individual covers, means for moving the slitted cover strip forward for the assembly operations, a conveyer for bringing the splint strips from the part making them to a point adjacent said slitted cover strip, means for tipping the match splints while on said conveyer, a receiving platform, means for ejecting at least two strips of splints simultaneously from the conveyer to said platform, means for aligning the two splint strips one above the other and moving them forward to engage with the means moving the cover strip, means for passing the splint strips onto the cover strip so the groups of match splints are properly positioned with respect to the slitted parts of the cover strip which is to form covers for said groups, means for folding the slitted covers on said creases over their corresponding groups of splints, means for stitching the covers and match groups together, and means for severing the groups into individual match books.

19. In a complete match book machine, a part for making the match splints in perforated groups on a strip, a part for making the covers including; means for putting an abrasive material on a portion of the cover strip, means for printing on the cover strip, means for drying the abrasive material and the printing, a transverse conveyer belt having pins spaced thereon for perforating and carrying the cover strip forward, means for creasing the cover strip a desired amount to assist in folding the covers, means for slitting the cover strip transversely a desired distance to form cover flaps, said transverse conveyer carrying the cover strip across the plane of a splint strip conveyer, a splint strip conveyer for bringing the splint strips from the part making them to the intersection point of said two conveyers, means for tipping the splints while on the splint conveyer, receiving means located at the intersection point of the two conveyers, means for ejecting at least two splint strips simultaneously from their conveyer to said receiving means, means for aligning the two splint strips one above the other so the perforations in the strips are in alignment, a part of said aligning means also serving to move the splint strips forward so the pins in the transverse conveyer carrying the cover strip enters the perforations in the splint strips and carries them forward with the cover strip, means for further aligning and compressing the splint strips and cover strip, means for folding the slitted cover strip over the splint groups, means for stitching the groups and covers together, and means for severing the groups into individual match books.

20. In a complete match book machine, a part for making the match splints in perforated groups on a strip, a part for making the covers including; means for putting an abrasive material on a portion of the cover strip, means for printing on the cover strip, means for drying the abrasive material and the printing, a transverse conveyer belt having pins spaced thereon for perforating and carrying the cover strip forward, means for creasing the cover strip a desired amount to assist in folding the covers, means for slitting the cover strip transversely a desired distance to form cover flaps, said transverse conveyer carrying the cover strip across the plane of a splint strip conveyer, a splint strip conveyer for bringing the splint strips from the part making them to the intersection point of said two conveyers, means for tipping the splints while on the splint conveyer, receiving means located at the intersection point of the two conveyers, means for ejecting at least two splint strips simultaneously from their conveyer to said receiving means, a movable flexible belt having fingers extending therefrom, means for moving said fingers between the splint groups just prior to their ejectment from the conveyer, said fingers acting to align the two splint strips one above the other and also acting to move the splint strips forward so the pins in the transverse conveyer carrying the cover strip enters the perforations in the splint strips and carries them forward with the cover strip, means for further aligning and compressing the splint strips and cover strip, means for folding the slitted cover strip over the splint groups, means for stitching the groups and covers together, and means for severing the groups into individual match books.

21. In a complete match book machine, a part for making the match splints in groups on a strip, a part for making the covers including; feed rolls for initially starting a cover strip through the machine, a supply tank carrying an abrasive material, a tracking device for carrying said material from said tank and applying a track of the same along one edge of the cover strip, means for partially drying said abrasive track, means for successively printing indicia on the cover strip at intervals corresponding to said splint groups, means for completing the drying of the abrasive material and the printing, means for perforating the cover strip, means for creasing the cover strip for assisting in folding the covers, means for slitting the cover strip a desired distance for the individual covers, means for moving the slitted cover strip forward for the assembly operations, a conveyer for bringing the splint strips from the part making them to a point adjacent said slitted cover strip, means for tipping the match splints while on said conveyer, a receiving platform, means for ejecting at least two strips of splints simultaneously from the conveyer to said platform, means for aligning the two splint strips one above the other and moving them forward to engage with the means moving the cover strip, means for passing the splint strips onto the cover strip so the groups of match splints are properly positioned with respect to the slitted parts of the cover strip which is to form covers for said groups, means for folding the slitted covers on said creases over their corresponding groups of splints, means for stitching the covers and match groups together and means for severing the groups into individual match books.

22. In a complete match book machine, a part for making the match splits in perforated groups on a strip, a part for making the covers including; feed rolls for initially starting a cover strip through the machine, a supply tank carrying an abrasive material, a tracking device for carrying said material from said tank and applying a track of the same along one edge of the cover strip, means for partially drying said abrasive track, means for successively printing indicia on the cover strip at intervals corresponding to said splint groups, means for completing the drying of the abrasive material and the printing, a transverse conveyer belt having pins spaced thereon for perforating and carrying the cover strip forward, means for creasing the cover strip a desired amount to assist in folding the covers, means for slitting the cover strip transversely a desired distance to form cover flaps, said transverse conveyer carrying the cover strip across the plane of a splint strip conveyer, a splint strip conveyer for bringing the splint strips from the part making them to the intersection point of said two conveyers, means for tipping the splints while on the splint conveyer, receiving means located at the intersection point of the two conveyers, means for ejecting at least two splint strips simultaneously from their conveyer to said receiving means, means for aligning the two splint strips one above the other so the perforations in the strips are in alignment, a part of said aligning means also serving to move the splint strips forward so the pins in the transverse conveyer carrying the cover strip enters the perforations in the splint strips and carries them forward with the cover strip, means for further aligning and compressing the splint strips and cover strip, means for folding the slitted cover strip over the splint groups, means for stitching the groups and covers together, and means for severing the groups into individual match books.

23. In a complete match book machine, a part for making the match splints in perforated groups on a strip, a part for making the covers including; feed rolls for initially starting a cover strip through the machine, a supply tank carrying an abrasive material, a tracking device for carrying said material from said tank and applying a track of the same along one edge of the cover strip, means for partially drying said abrasive track, means for successively printing indicia on the cover strip at intervals corresponding to said splint groups, means for completing the drying of the abrasive material and the printing, a transverse conveyer belt having pins spaced thereon for perforating and carrying the cover strip forward, means for creasing the cover strip a desired amount to assist in folding the covers, means for slitting the cover strip transversely a desired distance to form cover flaps, said transverse conveyer carrying the cover strip across the plane of a splint strip conveyer, a splint strip conveyer for bringing the splint strips from the part making them to the intersection point of said two conveyers, means for tipping the splints while on the splint conveyer, receiving means located at the intersection point of the two conveyers, means for ejecting at least two splint strips simultaneously from their conveyer to said receiving means, a movable flexible belt having fingers extending therefrom, means for moving said fingers between the splint groups just prior to their ejectment from the conveyer, said fingers acting to align the two splint strips one above the other and also acting to move the splint strips forward so the pins in the transverse conveyer carrying the cover strip enters the perforations in the splint strips and carries them forward with the cover strip, means for further aligning and compressing the splint strips and cover strip, means for folding the slitted cover strip over the splint groups, means for stitching the groups and covers together, and means for severing the groups into individual match books.

24. In a complete match book machine, a part for making the match splints in groups on a strip, a part for making the covers including; means for putting an abrasive material on a portion of the cover strip, means for printing on the cover strip, means for drying the abrasive material and the printing, means for perforating the cover strip, means for creasing the cover strip for assisting in folding the covers, means for slitting the cover strip a desired distance for the individual covers, means for moving the slitted cover strip forward for the assembly operations, a conveyer for bringing the splint strips from the part making them to a point adjacent said slitted cover strip, means for tipping the match splints while on said conveyer, a receiving platform, means for ejecting the splint strips from the conveyer to the platform, means for aligning said splint strips, means for moving said splint strips forward in the direction of movement of the cover strip, means for passing the splint strips onto the cover strip so the groups of match splints are properly positioned with respect to the slitted parts of the cover strip which is to form covers for said groups, a movable belt carrying a plurality of folding members, a plurality of cams for moving said folding members as they travel forward to fold the slitted cover strip over the splint groups, means for stitching the covers and match groups together and means for severing the groups into individual match books.

25. In a complete match book machine, a part for making the match splints in groups on a strip, a part for making the covers including; means for putting an abrasive material on a portion of the cover strip, means for printing on the cover strip, means for drying the abrasive material and the printing, means for perforating the cover strip, means for creasing the cover strip for assisting in folding the covers, means for slitting the cover strip a desired distance for the individual covers, means for moving the slitted cover strip forward for the assembly operations, a conveyer for bringing the splint strips from the part making them to a point adjacent said slitted cover strip, means for tipping the match splints while on said conveyer, a receiving platform, means for ejecting at least two strips of splints simultaneously from the conveyer to said platform, means for aligning the two splint strips one above the other and moving them forward to engage with the means moving the cover strip, means for passing the splint strips onto the cover strip so the groups of match splints are properly positioned with respect to the slitted parts of the cover strip which is to form covers for said groups, a movable belt carrying a plurality of pivoted L-shaped folding members, a plurality of cams disposed in the path of movement of said folding members to fold the slitted portions of the cover strip over the splint groups, means for stitching the covers and match groups together and means for severing the groups into individual match books.

26. In a complete match book machine, a part for making the match splints in perforated groups on a strip, a part for making the covers including; means for putting an abrasive material on a portion of the cover strip, means for printing on the cover strip, means for drying the abrasive material and the printing, means for perforating the cover strip, means for creasing the cover strip for assisting in folding the covers, means for slitting the cover strip a desired distance for the individual covers, means for moving the slitted cover strip forward for the assembly operations, a conveyer for bringing the splint strips from the part making them to a point adjacent said slitted cover strip, means for tipping the match splints while on said conveyer, a receiving platform, means for ejecting the splint strips from the conveyer to the platform, means for aligning said splint strips, means for moving said splint strips forward in the direction of movement of the cover strip, means for passing the splint strips onto the cover strip so the groups of match splints are properly positioned with respect to the slitted parts of the cover strip which is to form covers for said groups, a movable belt carrying a plurality of pivoted L-shaped folding members, a plurality of cams disposed in the path of movement of said folding members to fold the slitted portions of the cover strip over the splint groups, means for stitching the covers and match groups together and means for severing the groups into individual match books.

27. In a match book machine, the combination with a press for making strips of match splints of cardboard or the like, of a conveyer operated by said press to receive said splint strips as delivered by the press with means cooperating with the conveyer for tipping the match splints and a book-cover-making and assembly mechanism driven by said press for making and applying covers to said splint strips, said assembly mechanism including; means for removing the splint strips from the conveyer, means for aligning said splint strips and passing them onto the cover strip, means for moving the cover strip through the machine, means for folding the cover strip over the splint strips, means for stitching the covers to the splint strip, and means for cutting the strips into individual books of matches.

28. In a match book machine, the combination with a press for making strips of match splints of cardboard or the like, of a conveyer continuously operated at substantially a uniform speed by the press, said conveyer having rows of clips arranged to receive the splint strips as they are automatically delivered from the press, said conveyer having associated therewith means for tipping the splint ends as they are being moved forward in the cycle of operations and a book-cover-making and assembly mechanism driven by said press at timed intervals for making and applying covers to said splint strips, said assembly mechanism including means for removing the splint strips from the conveyer, means for aligning said splint strips and passing them onto the cover strip, means for moving the cover strip through the machine, means for folding the cover strip over the splint strips, means for stitching the covers to the splint strip and means for cutting the strips into individual books of matches.

29. In a match book machine, the combination with a press for making strips of match splints of cardboard or the like, of a conveyer continuously operated at substantially a uniform speed by the press, said conveyer having rows of clips arranged to receive the splint strips as they are automatically delivered from the press, said conveyer having associated therewith means for tipping the splint ends as they are being moved forward in the cycle of operations and a book-cover-making and assembly mechanism positioned substantially at right angles to and intersecting the path of movement of said conveyer and driven by said press at timed intervals for making and applying covers to said splint strips, said assembly mechanism including means for removing the splint strips from the conveyer, means for aligning said splint strips and passing them onto the cover strip, means for moving the cover strip through the machine, means for folding the cover strip over the splint strips, means for stitching the covers to the splint strip, and means for cutting the strips into individual books of matches.

30. In a match book machine, the combination with a press for making strips of match splints of cardboard or the like, of a conveyer operated by said press to receive said splint strips as delivered by the press with means cooperating with the conveyer for tipping the match splints and a book-cover-making and assembly mechanism driven by said press for making and applying covers to said splint strips, said assembly mechanism including; means for removing the splint strips from the conveyer in pairs, means for aligning said splint strips one over the other and passing them forward onto the cover strip, means for moving the cover strip and splint strips through the assembly part of the machine, an aligning passage for completing the aligning of the splint strips and cover strip preparatory to folding and stitching the two together, means for folding the cover strip over the splint strips, means for stitching the cover strip to the splint strip, and means for cutting the strips into individual books of matches.

31. In a match book machine, the combination with a press for making strips of match splints of cardboard or the like, of a conveyer continuously operated at substantially a uniform speed by the press, said conveyer having rows of clips arranged to receive the splint strips as they are automatically delivered from the press, said conveyer having associated therewith means for tipping the splint ends as they are being moved forward in the cycle of operations and a book-cover-making and assembly mechanism driven by said press at timed intervals for making and applying covers to said splint strips, said assembly mechanism including means for removing the splint strips from the conveyer in pairs, a feed strip belt carrying fingers, means for causing said fingers to align said splint strips one above the other and move them forward onto the cover strip, means for moving the cover strip and splint strips through the assembly part of the machine, an aligning passage for completing the aligning of the splint strips and cover strip preparatory to folding and stitching the two together, means for folding the cover strip over the splint strips, means for stitching the cover strip to the splint strip and means for cutting the strips into individual books of matches.

32. In a match book making machine as set forth in claim 30 further characterized in that the folding mechanism comprises a movable belt of the chain type carrying in spaced relation thereon a plurality of pivotally mounted folding members and a plurality of cams for moving said folding members against the cover strip to fold it over the splint strips.

33. In a match book making machine as set forth in claim 30 further characterized in that the folding mechanism comprises a movable belt of the chain type carrying in spaced relation thereon a plurality of pivotally mounted folding members and a plurality of cams for moving said folding members against the cover strip to fold it over the splint strips, and further characterized in that at least an additional cam acts on said folding members, after the cover strip has been folded to final position, to move said members back to their normal position preparatory to starting the folding operations.

34. A match book making machine, including; a press having, means for drawing a continuous strip of cardboard or the like from a roll, means for forming groups of splints from said strip, means for cutting off said strip transversely into splint strips composed of a plurality of said groups of splints; cover-making and printing mechanism having, parts for drawing a continuous strip of cover paper or the like from a roll, means for applying an abrasive material to one edge of the cover strip, means for printing indicia in spaced relation on the cover strip, means for drying the abrasive material and the printing, a transverse conveyer having means for then engaging the cover strip and moving it to an assembly place on the machine, means for creasing the cover paper to assist in folding and means for slitting the cover paper between the spaced indicia; an assembly mechanism; a conveyer operating between the press part of the machine and the assembly mechanism for receiving the splint strips from the press part and delivering them to said assembly mechanism; tipping means for tipping the splint ends as they are moved on said conveyer, said assembly mechanism having parts for removing the splint strips from the conveyer, means for aligning said strips as they come from the conveyer, means for moving the strips onto the cover paper, means for completing the alignment of the splint strips on the cover paper, means for folding the slitted portions of the cover strip over the body of the splint groups, means for stitching the splint strips and covers together according to the groups and means for separating the groups into individual books of matches; all of said parts being operated in timed relationship as and for the purposes described.

35. A match book making machine including; a press portion for making groups of match splints in strips from a continuous strip of cardboard or the like; a part for forming covers for the match books including the application to the covers of printed matter and an abrasive material on which the match splints may be subsequently lighted; an assembly portion including, means for receiving the splint strips and gathering them together with the covers, means for folding the covers over the assembled groups of match splints, means for stitching the books thus formed and finally means for cutting the books apart; a conveyer operating between the press portion and the assembly portion for carrying the splint strips from the press portion to the assembly portion; and means for tipping the match splints while they are on the conveyer; all of said portions being operated in timed relationship for the purposes described.

36. A match book making machine including; a press portion for making groups of match splints in strips from a continuous strip of cardboard or the like; a part for forming covers for the match books including the application to the covers of printed matter and an abrasive material on which the match splints may be subsequently lighted; an assembly portion including, means for receiving the splint strips and gathering them together with the covers, means for folding the covers over the assembled groups of match splints, stitching the books thus formed and finally cutting the books apart, said cover forming part and assembly portion being placed at right angles to the press portion; a conveyer extending from the press portion through the framework carrying the mechanism of the other portions for carrying the splint strips from the press to the assembly portion and means for tipping the splints while moving with the conveyer.

37. In a match-book machine, a part for making the match splints in strips from a continuous sheet of material, a single continuously moving conveyor for carrying the match strips away from said part that makes them, said conveyor having means arranged to directly receive and grip the edge of successive strips as they are thrust forward by said sheet and before the match strip is severed from the continuous sheet.

38. In a match-book machine, a press for receiving a continuous sheet of material and forming match splints therein, a single continuously moving conveyor for carrying said splints away in strips to another part of the machine, said conveyor having means arranged to directly receive the end of said sheet material as it is thrust forward by the press, and means operated by the press for shearing said sheet material into the match strips immediately said end has been inserted into said conveyor means.

39. In a match-book machine as set forth in claim 38, further characterized in that means are provided for insuring the proper timing of the conveyor and the press.

40. In a complete match-book machine, a part for receiving a continuous sheet of material and forming match splints therein, another part for receiving a continuous sheet of material and making book covers complete, including the addition of abrasive material and printing as required, therefrom and assembling the splints in strips with said covers, and a single continuously moving conveyor for carrying the splints away in strips from the first-mentioned part to the assembly place, said conveyor having means arranged to directly receive the end of the sheet material as it is thrust forward by said first mentioned part during the process of forming the splints, and means for shearing said sheet material into match strips, immediately said end has been inserted into said conveyor means.

41. In a complete match-book machine, mechanism for making the splint strips, mechanism for treating the cover material preparatory to assembling the splint strips thereon, assembly mechanism for assembling the split strips and covers, mechanism for conveying the splint strips to the assembly mechanism, said assembly mechanism including a conveyer having pins arranged in spaced relation thereon according to the width of the match books, said pins acting to perforate the cover strip and to then act as the motive power for drawing the cover paper through the machine.

42. In a complete match-book machine, mechanism for making the splint strips, mechanism for treating the cover material preparatory to assembling the splint strips thereon, assembly mechanism for assembling the splint strips and covers, mechanism for conveying the splint strips to the assembly mechanism, said assembly mechanism including an intermittently movable endless conveyer having pins thereon which act to perforate the cover strip as it comes onto the conveyer, said pins also acting as the motive power to draw the cover strip through the machine.

43. In a complete match-book machine, mechanism for making the splint strips, mechanism for treating the cover material preparatory to assembling the splint strips thereon, assembly mechanism for assembling the splint strips and covers, mechanism for conveying the splint strips to the assembly mechanism, said assembly mechanism including an intermittently movable endless conveyer having pins thereon which act to perforate the cover strip as it comes onto the conveyer, said pins also acting as the motive power to draw the cover strip through the machine, said pins also acting as alignment members and as a source of motive power for the splint strips after they have been assembled onto the cover strip over the pins.

44. In a match-book machine an assembly conveyer on which match splint strips and a strip for the covers are assembled, said conveyer having pins for perforating the cover strip and drawing it through the machine, said pins acting also as aligning members to properly position the splint strips on the cover strip.

In testimony whereof, I affix my signature.

RUSSELL W. SMITH.